United States Patent [19]

Lin et al.

[11] Patent Number: 4,731,264
[45] Date of Patent: Mar. 15, 1988

[54] SOL-GEL COMPOSITIONS CONTAINING SILANE AND ALUMINA

[75] Inventors: Chia-Cheng Lin, Gibsonia; Charlene A. Falleroni, New Kensington, both of Pa.

[73] Assignee: PPG Industries, Inc., Pittsburgh, Pa.

[21] Appl. No.: 915,344

[22] Filed: Oct. 3, 1986

[51] Int. Cl.⁴ .................. B05D 3/02; C08G 77/06
[52] U.S. Cl. .................. 427/387; 106/287.12; 427/262; 528/20
[58] Field of Search .................. 427/407.3, 387; 106/287.16, 287.12; 528/20

[56] References Cited

U.S. PATENT DOCUMENTS

| | | | |
|---|---|---|---|
| 3,004,863 | 10/1961 | Gray, Jr. et al. | 117/94 |
| 3,186,966 | 6/1965 | Bamford | 528/20 |
| 3,413,242 | 11/1968 | Roberts et al. | 528/20 X |
| 3,433,764 | 3/1969 | Walmsley | 528/20 |
| 3,450,672 | 6/1969 | Merrill | 528/20 |
| 3,582,395 | 6/1971 | Adams et al. | 117/124 |
| 3,865,599 | 2/1975 | Mansmann et al. | 106/65 |
| 3,941,719 | 3/1976 | Yoldas | 252/463 |
| 3,944,658 | 3/1976 | Yoldas | 423/626 |
| 3,986,997 | 10/1976 | Clark | 260/29.2 |
| 4,027,073 | 5/1977 | Clark | 428/412 |
| 4,208,475 | 6/1980 | Paruso et al. | 429/193 |
| 4,242,403 | 12/1980 | Mattimoe et al. | 428/213 |
| 4,244,986 | 1/1981 | Paruso et al. | 427/126.4 |
| 4,271,210 | 6/1981 | Yoldas | 427/169 |
| 4,275,118 | 6/1981 | Baney et al. | 428/412 |
| 4,278,632 | 7/1981 | Yoldas | 264/66 |
| 4,286,024 | 8/1981 | Yoldas | 428/446 |
| 4,293,594 | 10/1981 | Yoldas et al. | 427/107 |
| 4,294,950 | 10/1981 | Kato | 528/14 |
| 4,346,131 | 8/1982 | Yoldas | 428/35 |
| 4,357,427 | 11/1982 | Ho et al. | 501/153 |
| 4,368,313 | 1/1983 | Hayes | 528/14 |
| 4,390,373 | 6/1983 | White et al. | 106/287 |
| 4,405,679 | 8/1983 | Fujioka et al. | 428/216 |
| 4,435,219 | 3/1984 | Greigger | 106/287.16 |
| 4,442,168 | 4/1984 | White et al. | 428/331 |
| 4,477,499 | 10/1984 | Doin et al. | 427/412 |
| 4,500,669 | 2/1985 | Ashlock et al. | 524/440 |
| 4,568,578 | 2/1986 | Arfsten et al. | 428/34 |
| 4,571,365 | 2/1986 | Ashlock et al. | 428/412 |

FOREIGN PATENT DOCUMENTS

| | | |
|---|---|---|
| 84303605.4 | 12/1984 | European Pat. Off. . |
| 85110293.9 | 2/1986 | European Pat. Off. . |
| 1494209 | 12/1977 | United Kingdom . |

OTHER PUBLICATIONS

*Physics of Thin Films*, vol. 5.
*Journal of Applied Polymer Science*, vol. 26.
*Journal of Non-Crystalline Solids*, vol. 63 (1984).
*Polymer Bulletin*, No. 14 (1985).

Primary Examiner—Thurman K. Page
Attorney, Agent, or Firm—Donna L. Seidel

[57] ABSTRACT

An organoalkoxysilane/alumina sol-gel composition and method for its production are disclosed whereby an aluminum alkoxide is hydrolyzed in water to form a sol, to which is added a hydrolyzable organoalkoxysilane of the general formula

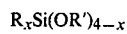

$$R_xSi(OR')_{4-x}$$

wherein R is an organic radical, R' is a low molecular weight alkyl radical, and x is at least 1 and less than 4. The composition is dried and cured to form an organosiloxane/alumina monolith or coating on a substrate.

20 Claims, No Drawings

SOL-GEL COMPOSITIONS CONTAINING SILANE AND ALUMINA

FIELD OF THE INVENTION

The present invention relates generally to sol-gel compositions, and more particularly to sol-gel compositions containing silicon and aluminum.

BACKGROUND

U.S. Pat. Nos. 3,941,719 and 3,944,658 to Yoldas describe a transparent nonparticulate alumina prepared by hydrolyzing aluminum alkoxides to form a clear sol which forms a gel, retaining its integrity during drying and pyrolysis.

U.S. Pat. Nos. 4,208,475 and 4,244,986 to Paruso and Yoldas describe a liquid polymer formed from organometallic sodium and aluminum compounds, at least one of which is partially hydrolyzed. The polymer is hydrolyzed, dried to form amorphous sodium Beta-alumina precursor, and then heated to 1200–1550° C. to form a ceramic comprising ion-conductive sodium Beta-alumina which is useful as a solid electrolyte.

U.S. Pat. No. 4,271,210 to Yoldas discloses a method of forming an optically clear, porous metal oxide layer having a low refractive index on a glass substrate by dipping the substrate into a clear colloidal solution of metal alkoxide. The low refractive index porous metal oxide layer forms an effective anti-reflective layer.

U.S. Pat. No. 4,286,024 to Yoldas discloses a high temperature resistant transparent monolithic member or coating consisting of aluminum and silicon in a ratio of about 2:1 and in reacted oxide form, formed by reacting precursor alkoxides of aluminum and silicon in the presence of water to form a clear solution, gelling the reacted precursors, and drying the gel in the form of a monolithic member or coating on a substrate. The dried material is then heated to evolve all residual hydrogen, carbon and water and to eliminate porosity.

U.S. Pat. No. 4,357,427 to Ho et al discloses a method for preparing alumina doped with a small percentage of magnesia by first forming a mixed clear solution of aluminum alkoxide and a small amount of magnesium in the form of alkoxide or water-soluble magnesium salt, adding an acid and water in excess of the amount required to completely hydrolyze the alkoxide, and allowing the resulting milky slurry to fully hydrolyze to form a clear sol. The sol may be spray-dried to produce a powder, or gelled, dried and mechanically pulverized.

U.S. Pat. Nos. 4,500,669 and 4,571,365 to Ashlock et al discloses transparent abrasion-resistant coating compositions comprising a colloidal dispersion of a water-insoluble dispersant in a water-alcohol solution of the partial condensate of silanol wherein the dispersant comprises metals, alloys, salts oxides and hydroxides thereof.

SUMMARY OF THE INVENTION

The present invention involves the preparation of silane/alumina sol-gel compositions by adding an organoalkoxysilane into an aqueous alumina sol prepared from a hydrolyzable aluminum alkoxide. The organoalkoxysilane hydrolyzes and condenses with the hydrolyzed aluminum alkoxide to form a siloxane/alumina copolymer with an organic constituent. The organosiloxane/alumina compositions of the present invention may further comprise a pigment or blend of pigments in order to form a non-porous durable paint which can be applied by conventional methods and cured conveniently at temperatures as low as 80° C.

DESCRIPTION OF THE PREFERRED EMBODIMENT

A sol-gel system for producing an organosiloxane/alumina composition may be prepared in the following manner. First, an aluminum alkoxide is hydrolyzed using water as solvent. The temperature is preferably maintained at about 80° C. during hydrolysis to prevent the formation of insoluble bayerite. Various hydrolyzable aluminum alkoxides may be used to form a sol in accordance with the present invention. Preferably, aluminum alkoxides are of the general formula $Al(OR)_3$, wherein R is preferably an alkyl radical of the general formula $C_nH_{2n+1}$ wherein n is from 2 to 4. Aluminum isopropoxide is a particularly preferred aluminum alkoxide. Preferably, aluminum isopropoxide is added to water which has been heated to 80° C., followed by an acid hydrolyzing agent. Various acids may be used in accordance with the present invention; both inorganic acids, such as nitric and hydrochloric acids, and organic, such as acetic and dichloroacetic acids. The basic hydrolysis reaction is illustrated below.

The condensation reaction may involve alkoxy and/or hydroxyl groups, and produce water or alcohol according to either of the following reactions.

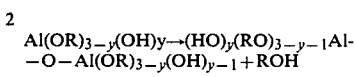

or

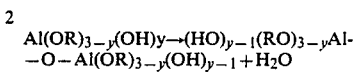

The hydrolysis and condensation reactions continue until substantially all of the alkoxy groups are hydrolyzed, and condensation yields a composition of aluminum-oxygen network containing pendent and terminal hydroxyl groups, having the empirical formula AlO(OH).

In one preferred embodiment of the present invention, the aluminum alkoxide is added to 80° C. water in a pressure vessel. After the acid is added, the vessel is sealed, and the mixture is heated under pressure. Using aluminum isopropoxide, heating to 125° C. for two hours, the pressure reaches about 50 psi. A clear sol is formed in hours under pressure, compared with days at ambient pressure, and precipitation of insoluble aluminum hydroxide is avoided.

In a preferred embodiment of this invention, an alumina sol condenses to form a gel which is weakly cross-linked, such that when the gel is heated to approximately 60° C. in a closed container, it converts back to a clear sol. The reformed sol will gel again within about 72 hours at room temperature. This reversible characteristic provides an alumina sol-gel composition with a relatively long shelf life.

After preparation of the alumina sol, an organoalkoxysilane is added. The organoalkoxysilane reacts with the hydrolyzed alumina sol to form a silicon-oxygen-aluminum network according to the following general reaction.

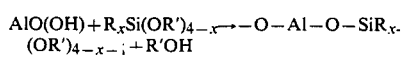

In an aqueous alumina sol, the remaining alkoxy groups of the organoalkoxysilane are hydrolyzed according to the following general reaction

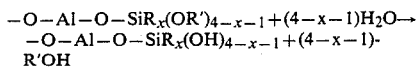
$$-O-Al-O-SiR_x(OR')_{4-x-1} + (4-x-1)H_2O \rightarrow$$
$$-O-Al-O-SiR_x(OH)_{4-x-1} + (4-x-1)R'OH$$

Various organoalkoxysilanes may be used in accordance with the present invention. Organoalkoxysilanes of the general formula $R_xSi(OR')_{4-x}$ wherein x is less than 4 and preferably is one, R is an organic radical, and R' is a low molecular weight alkyl radical are preferred. R is preferably a low molecular weight, preferably from one to six carbon, alkyl or vinyl, methoxyethyl, phenyl, γ-glycidoxypropyl or γ-methacryloxypropyl. R' is preferably a two to four carbon alkyl group. Particularly preferred organoalkoxysilanes are those wherein R is methyl and R' is ethyl; a most preferred organoalkoxysilane is methyl triethoxysilane. The organoalkoxysilane is preferably added in an amount such that the molar ratio of silica ($SiO_2$) to alumina ($Al_2O_3$) is from about 10:1 to about 1:1, more preferably from about 6:1 to 3:1. The resulting organosiloxane/alumina sol is useful as a coating composition for application to a substrate surface.

In one embodiment of the present invention, a transparent, colorless organoalkoxysilane/alumina composition may be applied to a plastic transparency by any of a variety of methods such as spinning, spraying, dipping or flowing to form a continuous coating. Upon drying and curing at about 100° C., a durable, glassy coating is formed which improves the surface properties of the plastic transparency. Preferred coating thickness is in the range of about 1 to 20 microns. A coating about 5 microns thick provides a protective surface comparable to a glass surface in abrasion resistance. Bayer abrasion testing of the coated surface involves abrading the coated surface with 1000 grams of quartz sand in the 6 to 14 mesh size range for 300 cycles according to ASTM F-735 and comparing the transmittance and haze before and after abrasion.

In another embodiment of the present invention, pigments may be added to the organoalkoxysilane/alumina sol, which may be applied, dried and cured as a translucent or opaque paint on a variety of substrates. Preferably pigments include inorganic oxides such as colored metal oxides and titania coated mica. Appropriate temperatures for curing the coating depend on the substrate. Preferably, if the coating is applied to acrylic, the temperature is held at about 80° C. to 85° C. For coatings on polycarbonate, temperatures of 120° C. to 130° C. are preferred. Less temperature sensitive substrates, such as glass and metal, can be coated and cured at temperatures in the range of 250° C. to 600° C. The higher the temperature, the faster the cure. Preferably, the organoalkoxysilane/alumina composition may contain fillers such as talc or mica to adjust the thermal expansion of the coating to match that of the substrate in order to avoid cracking of the coating or crazing of the substrate. A preferred additive is mica in theoretical 3000 mesh particle size of 5 to 10 microns in diameter by 0.5 micron thickness available as Micro Mica C-3000 from The English Mica Co., Stamford, Connecticut.

Preferred organoalkoxysilane/alumina compositions for use as architectural coatings on glass comprise an alumina sol which is between 3 and 16 percent solids, and sufficient organoalkoxysilane to provide a molar ratio of about 10:1 to 1:1, preferably 6:1 to 3:1, silica ($SiO_2$) to alumina ($Al_2O_3$). Pigments and fillers may be added up to about a 50 percent solids level. The resulting coating composition is preferably sprayed or flow coated onto a glass substrate surface. The coated surface may be heated in an oven or under infrared heaters, preferably to at least about 250° F. (about 121° C.), more preferably to about 500° F. (about 260° C.), to cure the coating. All of the water and organic solvent is removed, leaving an oxide-containing network, containing pigments and fillers, which is sufficiently dense to survive a durability test consisting of immersion for 24 hours in boiling water. The finish of the coating may be matte if inorganic oxide pigments are used, such as the metal oxide pigments available from the Shepherd Chemical Co. A glossy finish may be obtained by using titania-coated mica pigments, such as the Afflair series from E. & M. Chemical Company. A matte color finish may be made glossy with a clear glassy overcoat of a transparent silane-alumina composition in accordance with the present invention. Preferred opaque coatings on glass range from 7.5 to 12 microns in thickness.

The present invention will be further understood from the descriptions of specific examples which follow.

EXAMPLE I

An aqueous sol containing 4.0 percent by weight alumina ($Al_2O_3$) is prepared by mixing together 174 grams of aluminum isopropoxide ($Al(OC_3H_7)_3$), 900 grams of deionized water and 13 grams of glacial acetic acid. The mixture is stirred for 2 hours at 120° C. in a pressure vessel to form a clear sol. To 224.3 grams of the alumina sol are added 22.43 grams of methyl triethoxysilane ($CH_3Si(OC_2H_5)_3$) and 29.74 grams of γ-glycidoxypropyl trimethoxysilane

$$(CH_2CHCH_2O(CH_2)_3Si(OCH_3)_3).$$

This mixture is subjected to ultrasonic mixing for half an hour and then mechanical stirring overnight. Finally, 5 grams of deionized water and 2 grams of 2-propanol are added containing 0.9 grams of ammonium perchlorate, $NH_4ClO_4$, as an epoxy curing catalyst.

A polycarbonate substrate is treated on the surface to be coated with an aminosilane primer available as A1120 from Union Carbide. In this example both surfaces of the substrate are primed for coating by dipping the substrate in the aminosilane primer for 7 minutes, rinsing with 2-propanol and the water, and drying at 60° C. to 80° C. for about 30 minutes. The primed polycarbonate substrate is dipped into the above-described organosiloxane/alumina composition for 1 minute and air dried for half an hour at ambient temperature. The coated polycarbonate is then placed in an oven for curing of the coating at 60° C. for half an hour, followed by 130° C. for six hours. After the coated polycarbonate is cooled to room temperature, its optical properties are measured to be 89.3 percent transmittance and 0.5 percent haze. After 300 cycles of Bayer abrasion testing, the coated polycarbonate maintained 87.8 percent transmittance and has 9.7 percent haze, compared with 60 to 65 percent haze for uncoated polycarbonate after 300 cycles of Bayer abrasion testing.

EXAMPLE II

Another organoalkoxysilane/alumina coating composition is prepared as follows. An alumina sol containing 4.5 percent alumina (Al$_2$O$_3$) is prepared by mixing together 200 grams of aluminum isopropoxide (Al(OC$_3$H$_7$)$_3$), 900 grams of deionized water and 14.6 grams of glacial acetic acid. The mixture is stirred in a pressure vessel at 120° C. for 2 hours to form a clear sol. To 200 grams of the alumina sol are added 23.55 grams of methyl triethoxysilane (CH$_3$Si(OC$_2$H$_5$)$_3$) and 31.20 grams of γ-glycidoxypropyl trimethoxysilane

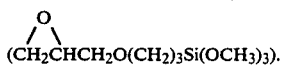

(CH$_2$CHCH$_2$O(CH$_2$)$_3$Si(OCH$_3$)$_3$).

This mixture is subjected to ultrasonic mixing for half an hour, then mechanical stirring overnight. Finally, 5 grams of deionized water, 5 grams of 2-propanol and 0.9 grams of ammonium perchlorate are added, and the mixture is stirred for another 10 minutes.

As in the previous example, a polycarbonate substrate is treated on both surfaces with an aminosilane primer, dipped for one minute in the above-described organoalkoxysilane/alumina composition and air-dried for half an hour. To cure the coating, the coated polycarbonate is placed in an oven at 60° C. for half an hour; the temperature of the oven is then raised to 130° C. over a period of 15 minutes and held at 130° C. for one hour. After the coated polycarbonate is cooled to room temperature, its optical properties are measured to be 89.3 percent transmittance and 0.7 percent haze. After 300 cycles of Bayer abrasion testing the transmittance is 88.3 percent and the haze is 7.2 percent, compared with 60 to 65 percent haze for uncoated polycarbonate after 300 cycles of Bayer abrasion testing.

EXAMPLE III

An aqueous alumina sol containing 5 percent by weight alumina (Al$_2$O$_3$) is prepared by mixing together 225 grams of aluminum isopropoxide (Al(OC$_3$H$_7$)$_3$), 900 grams of water and 19.8 grams of glacial acetic acid. The mixture is stirred for 2 hours at 120° C. in a pressure vessel to form a clear sol. To 240 grams of the alumina sol is added 136 grams of methyl triethoxysilane (CH$_3$Si(OC$_2$H$_5$)$_3$) to provide a molar ratio of silica:aluminum (SiO$_2$:Al$_2$O$_3$) of 8:1. This composition is flow coated onto ¼ inch thick stretched acrylic substrates, which have been treated with a silane primer, and heated to 82° C. to form a glassy coating. Coated acrylic substrates have transmittance of 93.3 to 93.4 percent and haze of 5.6 to 8.4 percent. After 300 cycles of Bayer abrasion testing, these coated acrylic substrates have transmittance of 92.5 to 92.8 percent and haze of 14.9 to 16.5 percent. By comparison, uncoated stretched acrylic samples have 54 to 57 percent haze after 300 cycles of Bayer abrasion testing.

EXAMPLE IV

An organoalkoxysilane/alumina composition is prepared as in the previous examples, comprising 100 grams of 6 percent alumina sol and 61 grams of methyl triethoxysilane (CH$_3$Si(OC$_2$H$_5$)$_3$) for a silica:alumina (SiO$_2$:Al$_2$O$_3$) ratio of 6:1. To this composition are added 2.64 grams of No. 9 blue inorganic oxide pigment from Shepherd Chemical Co., 5.64 grams of titania-coated mica pigment Afflair 240 from E. & M. Chemical Co., and 2.64 grams of Micro Mica C-3000 from The English Mica Co., of Stamford, Conn., mica of average particle size 5 to 10 microns diameter by ½ micron thickness to adjust the thermal expansion. Two drops of Zonyl FSN surfactant from Dupont are added to improve wetting. This "paint" composition is sprayed onto glass, aluminum and stainless steel substrates. After air-drying, the coated glass substrates are heated to 400° F. (about 204° C.) for 2 hours, while the coated metal substrates are heated at 1180° F. (about 638° C.) for a few minutes. The result in all cases is a durable opaque glassy coated substrate suitable for use, e.g., as a spandrel product. The durability of the coating is established by all of the coated substrates passing a durability test of 24 hours immersion in boiling water without coating deterioration.

EXAMPLE V

An organoalkoxysilane/alumina composition is prepared, applied, dried and cured in accordance with the previous example. The composition comprises grams of 6 percent alumina sol, 81 grams of methyltriethoxysilane (CH$_3$Si(OC$_2$H$_5$), 6.64 grams of Shepherd blue No. 9 metal oxide pigment, 6.64 grams of Afflair 240 titania-coated mica Pigment, 6.64 grams of mica and 2 drops of Zonyl FSN. A durable opaque coating with a silica:alumina ratio of 8:1 is formed on both glass and metal substrates as shown by passing the 24 hours in boiling water durability test.

EXAMPLE VI

An organoalkoxysilane/alumina composition is prepared, applied, dried and cured as in the previous example, comprising 200 grams of 6 percent alumina sol, 20.5 grams of methyltriethoxysilane (CH$_3$Si(OC$_2$H$_5$), 3.7 grams of Shepherd blue pigment, 3.7 grams of Afflair 240 pigment, 3.7 grams of mica and 2 drops of Zonyl FSN surfactant. A durable opaque coating having a silica:alumina ratio of 1:1 is formed.

EXAMPLE VII

A composition as in the previous example comprising 100 grams of 6 percent alumina sol, 102 grams of methyltriethoxysilane (CH$_3$Si(OC$_2$H$_5$)$_3$), 8 grams of Shepherd blue inorganic oxide pigment, 8 grams of Afflair 240 titania-coated mica pigment, 8 grams of mica and 2 drops of Zonyl FSN produces durable opaque coatings having a silica:alumina ratio of 10:1.

EXAMPLE VIII

A composition as in the previous example except comprising 100 grams of 7 percent alumina sol, 72 grams of methyltriethoxysilane (CH$_3$Si(OC$_2$H$_5$)$_3$) and 6.22 grams each of Shepherd blue pigment, Afflair 240 pigment and mica produces durable opaque coatings having a silica:alumina ratio of 6:1.

EXAMPLE IX

A composition as in the previous example except comprising 100 grams of 7 percent alumina sol, 36 grams of methyltriethoxysilane (CH$_3$Si(OC$_2$H$_5$)$_3$) and 3.8 grams each of Shepherd blue metal oxide oxide pigment, Afflair 240 titania-coated mica pigment and mica produces durable opaque coatings having a silica:alumina ratio of 3:1.

EXAMPLE X

An alumina sol containing 3.1 percent alumina (Al$_2$O$_3$) is prepared by hydrolyzing 157 grams of aluminum isopropoxide (Al(OC$_3$H$_7$)$_3$) in 1100 grams of water at 80° C., adding 13.84 grams of acetic acid and stirring in a pressure vessel at 120° C. for 2 hours. To 59 grams of the sol are added 7 grams of methyltriethoxysilane (CH$_3$Si(OC$_2$H$_5$)$_3$) and 1.66 grams of Afflair 100 titania-coated mica pigment. After stirring for 4 hours, the composition is sprayed on glass and heated at 1180° F. (about 638° C.) for about 30 minutes. The coated sample passes the 24 hours in boiling water durability test.

The above examples are offered to illustrate the present invention. Various organoalkoxysilanes and aluminum alkoxides may be used in a wide range of proportions and concentrations, and cured using different temperatures and cycles. Any pigments, fillers and other additives compatible with the organoalkoxysilane/alumina compositions of the present invention may be employed in any amount which does not interfere with network formation. Various plastic substrates may be coated with the silane/alumina compositions of the present invention e.g. to improve abrasion resistance, nonplastic substrates such as glass may be painted with pigmented compositions, and metal substrates may be coated with clear or colored compositions e.g. to improve corrosion resistance or produce spandrel products in accordance with the present invention, the scope of which is defined by the following claims.

We claim:

1. A composition of matter comprising the polymerization reaction product of the hydrolyzate of an aluminum alkoxide and an organoalkoxysilane of the general formula $$R_xSi(OR')_{4-x}$$

wherein R is an organic radical, R' is a low molecular weight alkyl radical and x is at least one and less than 4.

2. A composition according to claim 1, wherein R is selected from the group consisting of alkyl, vinyl, methoxyethyl, phenyl, γ-glycidoxypropyl, γ-methacryloxypropyl and mixtures thereof.

3. A composition according to claim 1, wherein R' is an alkyl radical of the general formula C$_n$H$_{2n+1}$ wherein n is from 2 to 4.

4. A composition according to claim 3, wherein R' is selected from the group consisting of methyl, ethyl and propyl.

5. A composition according to claim 4, wherein R is methyl, R' is ethyl, and x is 1.

6. A composition according to claim 1, wherein said aluminum alkoxide has the general formula Al(OR)$_3$ wherein R is a low molecular weight alkyl radical.

7. A composition according to claim 6, wherein the aluminum alkoxide is aluminum isopropoxide, Al(OC$_3$H$_7$)$_3$.

8. A composition according to claim 1, wherein said organoalkoxysilane comprises at least one organoalkoxysilane which comprises an epoxy-containing alkyl radical.

9. A composition according to claim 8, wherein said organoalkoxysilane comprises an epoxyalkoxysilane in combination with an alkylalkoxysilane.

10. A composition according to claim 9, wherein said organoalkoxysilane comprises γ-glycidoxypropyl trimethoxysilane and methyl triethoxysilane, and said aluminum alkoxide is aluminum isopropoxide.

11. A method of making an organoalkoxysilane/alumina composition comprising the steps of:
   a. hydrolyzing an aluminum alkoxide; and
   b. adding to said hydrolyzate an organoalkoxysilane of the general formula $$R_xSi(OR')_{4-x}$$

wherein R is an organic radical, R' is a low molecular weight alkyl radical, and x is at least 1 and less than 4.

12. A method according to claim 11, wherein the step of hydrolyzing said aluminum alkoxide is carried out in water to form a clear sol.

13. A method according to claim 12, wherein the step of hydrolyzing said aluminum alkoxide is carried out in the presence of an acid.

14. A method according to claim 13, wherein the step of hydrolyzing said aluminum alkoxide is carried out at above ambient pressure.

15. A method according to claim 12, wherein the step of adding said organoalkoxysilane is followed by essentially completely hydrolyzing said composition.

16. A method according to claim 11, further comprising the step of drying said composition to remove water and alcohol.

17. A method according to claim 16, further comprising the step of curing said composition to form an inorganic polymer network.

18. A method according to claim 17 further comprising the step of applying said composition to the surface of a substrate, wherein said drying and curing steps are carried out on said substrate thereby forming a coating on said substrate.

19. A method according to claim 18, wherein said curing step is carried out at elevated temperature.

20. A method according to claim 19, wherein said curing step is carried out at a temperature between 80° C. and 600° C.

* * * * *